United States Patent
Cervelli et al.

(10) Patent No.: US 12,026,810 B2
(45) Date of Patent: Jul. 2, 2024

(54) ONTOLOGY-BACKED AUTOMATIC CHART CREATION

(71) Applicant: Palantir Technologies Inc., Denver, CO (US)

(72) Inventors: Daniel Cervelli, Mountain View, CA (US); Timothy Slatcher, Menlo Park, CA (US); Adam Storr, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 165 days.

(21) Appl. No.: 17/449,868

(22) Filed: Oct. 4, 2021

(65) Prior Publication Data

US 2022/0028136 A1 Jan. 27, 2022

Related U.S. Application Data

(63) Continuation of application No. 17/089,473, filed on Nov. 4, 2020, now Pat. No. 11,164,350, which is a
(Continued)

(51) Int. Cl.
*G06T 11/20* (2006.01)
*G06F 16/901* (2019.01)
*G06F 16/904* (2019.01)

(52) U.S. Cl.
CPC ........ *G06T 11/206* (2013.01); *G06F 16/9024* (2019.01); *G06F 16/904* (2019.01)

(58) Field of Classification Search
None
See application file for complete search history.

(56) References Cited

U.S. PATENT DOCUMENTS 10,861,203 B1 12/2020 Cervelli et al.
11,164,350 B2 11/2021 Cervelli et al.
(Continued)

OTHER PUBLICATIONS

Cascading Filters YouTube video (https://www.youtube.com/watch?app=desktop&v=Dhl4z3525WY , Nov. 27, 2015). (Year: 2015).*
(Continued)

*Primary Examiner* — Yi Wang
(74) *Attorney, Agent, or Firm* — Knobbe, Martens, Olson & Bear, LLP

(57) ABSTRACT

Systems and methods for creating filtered data using graphical methodology. Stored data relationally-linked by an ontology are representable in rows and columns format. The system receives a first input selecting a first data source, displays a portion of the first data source in a first chart, receives a second input identifying a portion of the first chart, generates a first filter based on the identified portion, receives a third input selecting a linked object set, displays an indicator of the linked object set in a second sidebar, displays a portion of the linked object set in a second chart depicting information of the linked object set filtered by the first filter, receives a fourth input identifying a portion of the second chart, generates a second filter based on the identified portion, and displays fields of the linked object set, filtered by the first and second filter, in a third chart.

17 Claims, 10 Drawing Sheets

Related U.S. Application Data continuation of application No. 16/274,037, filed on Feb. 12, 2019, now Pat. No. 10,861,203.

(60) Provisional application No. 62/729,107, filed on Sep. 10, 2018.

(56) References Cited

U.S. PATENT DOCUMENTS

| | | |
|---|---|---|
| 2006/0142949 A1 | 6/2006 | Helt |
| 2012/0221553 A1 | 8/2012 | Wittmer et al. |
| 2015/0170077 A1 | 6/2015 | Kara et al. |
| 2019/0065014 A1* | 2/2019 | Richter .................. G06T 11/60 |
| 2019/0074082 A1* | 3/2019 | Buckler .................. G06F 40/56 |
| 2020/0050695 A1 | 2/2020 | Benjamin et al. |

OTHER PUBLICATIONS

U.S. Appl. No. 10/861,203, Ontology-Based Automatic Chart Creation, filed Dec. 8, 2020.
U.S. Appl. No. 11/164,350, Ontology-Based Automatic Chart Creation, filed Nov. 2, 2021.

* cited by examiner

ONTOLOGY-BACKED AUTOMATIC CHART CREATION

TECHNICAL FIELD

The present disclosure relates to systems and techniques for data integration, analysis, and visualization. More specifically, to systems and techniques for an ontology backed chart creation and graphical data set filtering operations.

BACKGROUND

In a variety of applications, large data sets are examined by data analyst. Often, graphing the data set, or portion of the data set, can quickly reveal information about the data set that is difficult, if not impossible, to otherwise determine. Graphing of the data set can also identify portions of the data set for further investigation. As the quantity of information increases in a data set, it may increasingly be difficult for current data manipulation and graphing tools to effectively perform desired graphing and analytic functions, and require more an analyst's time. In addition, current graphing tools do not readily facilitate graphical selection and filter generation processes that can drill-down into specific portions of multiple data sets with commonalties, and subsequently graph parts of a data set and display details of the data set in a table.

SUMMARY

To address these problems, a system may include a software application configured to provide a user interface (UI) and workflow for interacting with data sets that are linked based on an ontology, creating charts from those linked data sets, and creating cohorts (filters) that generate updated charts based on the generated cohorts. The UI may include a first sidebar (or "display portion") listing data sets (or "data sources" or simply "sources") having numerous data fields, a main panel for displaying graphs (or "charts") and tables, a second sidebar positioned between the main panel and the first sidebar that may display filter and chart specific information. The UI may further include a third sidebar/display portion aligned, for example, along a lower portion of the UI (e.g., below the first and second sidebar, and the main panel) that displays a selectable list of chart thumbnails reflecting generated charts of filtered data.

In operation, a user may select a data set in the sidebar, drag and drop a field of the data set into the main panel, and the UI depicts the information in the field of the data set as a chart. A portion of the chart can be selected and defined as a "cohort" which is a filter that indicates a portion of a data to be displayed. Generation and use of cohorts and the operations described herein allow desired data to be analyzed in more detail. The cohort may be saved in the first sidebar. Additional cohorts can be created and applied, singly or in combination, to filter a data set and produce corresponding charts and tables. Information from other linked data sets, which corresponds to the filtered data set, can be displayed in tabular and/or chart format, all facilitated by simple drag and drop operations. The additional cohorts can also be displayed in the first sidebar, and selected for use at any time. Chart thumbnails, displayed in the third sidebar, can be selected for display in the main panel, and additional data analysis can begin starting from that displayed chart.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above-and/or below-described embodiments (including one or more aspects of the appended claims).

In various embodiments, computer-implemented methods are disclosed in which, by one or more processors executing program instructions, one or more aspects of the above-and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

In one innovation, a system includes a first non-transitory computer storage medium configured to store two or more data sets each representable in tabular rows and columns format, the two or more data sets relationally-linked based on an ontology, a second non-transitory computer storage medium configured to at least store computer-executable instructions, and one or more computer hardware processors in communication with the second non-transitory computer storage medium. The one or more computer hardware processor are configured to execute the computer-executable instructions to at least cause presentation of an indicator of at least one data source in a first sidebar of a user interface, receive a first user input selecting a first data source from the at least one data source, generate and cause display of a portion of the first data source in a first chart in a main panel of the UI, receive a second user input identifying a portion of the first chart, generate a first filter based on the identified portion of the first chart and display an indicator of the first filter in the first sidebar, and cause presentation of an indicator of at least one linked object set in the first sidebar of the UI, the at least one linked object set including information linked to the information in the first data source. The one or more computer hardware processor are configured to execute the computer-executable instructions to receive a third user input selecting a linked object set, the linked object set linked by an ontology to the first data source by at least one common data type, generate and cause graphical display of the selected linked object set and the first filter in a second sidebar of the user interface, generate and cause graphical display of a portion of the linked object set in a second chart in the main panel, the second chart including depicting information of the linked object set filtered by the first filter, receive a fourth user input identifying a portion of the second chart, generate a second filter based on the identified portion of the second chart, and display an indicator of the second filter, and generate and cause display of fields of the linked object set, filtered by the first filter and the second filter, in a third chart in the main panel.

Embodiments of such systems may include one or more of the following other features. In some embodiments, the one or more computer hardware processors are further configured to generate and cause display of fields of the linked object set, filtered by the first filter and the second filter, in tabular rows and columns format. In some embodiments, the one or more computer hardware processors are further configured to generate and display a thumbnail chart of the second chart in a third sidebar of the user interface.

In some embodiments, the one or more computer hardware processors are further configured to generate and display a thumbnail chart of the third chart in the third sidebar. In some embodiments, the third sidebar is located in a position lower on the user interface than the main panel, relative to the orientation of the user interface. In some embodiments, the first sidebar is located on the user interface in a lateral position on the user interface relative to the main panel (e.g., disposed relative to the main panel in a generally horizontal alignment), the second sidebar is located in a position between the first side panel and the main panel (e.g., also disposed relative to the main panel in a generally horizontal alignment), and the third sidebar is located in a position lower on the user interface than the main panel, relative to the orientation of the user interface. In some embodiments, the one or more computer hardware processors are further configured to execute the computer-executable instructions to further generate and cause display of the first sidebar along a side of the main panel. In some embodiments, the one or more computer hardware processors are further configured to execute the computer-executable instructions to further generate and cause display of a user selectable fields of the first data source in the first sidebar, wherein the first chart depicts information of at least one of the user selectable fields.

In some embodiments of such systems, the one or more computer hardware processors are further configured to execute the computer-executable instructions to generate and cause display of the indicator of the second filter in the first sidebar. In some embodiments, the one or more computer hardware processors are further configured to execute the computer-executable instructions to generate and cause display of the indicator of the second filter in the second sidebar, such that the second sidebar include filtering drill-down information of the second chart. In some embodiments, the user input comprises a drag and drop command.

In some embodiments, the one or more computer hardware processors are further configured to execute the computer-executable instructions to display chart options during a user input of the drag and drop command, the chart options including different options for depicting the chart. In some embodiments, the chart options include a bar chart and a column chart. In some embodiments, the chart options include chart sub-options, including selection of a scale for one of the axis on the chart.

In some embodiments, the one or more computer hardware processors are further configured to execute the computer-executable instructions to receive user input identifying two different filtered datasets, and generate and display in the main panel a comparison chart comparing the identified two filtered data sets. In some embodiments, the comparison chart depicts information from each of the two filtered data sets side-by-side, in similar bins along the X-axis. In some embodiments, the comparison chart depicts information from each of the two filtered data sets in a stacked configuration in the same bin along the X-axis. In some embodiments, the one or more computer hardware processors are further configured to execute the computer-executable instructions to receive a user input of a selection of a displayed thumbnail chart, display a chart corresponding to the selected thumbnail chart in the main panel, reset the filtering displayed in the second sidebar to reflect the chart displayed in the main panel, and receive a user input for further filtering that uses the reset filtering as the starting point for the further filtering. In some embodiments, the one or more computer hardware processors are further configured to execute the computer-executable instructions to, for generated filters, monitor the data source the filter is applied to, and generate an alert when the data source changes.

Another innovation includes a method for graphically filtering data sets linked by an ontology. The method may be performed by one or more computer hardware processors configured to execute computer-executable instructions on a second non-transitory computer storage medium. Various embodiments of the method may comprise presenting an indicator of at least one data source in a first sidebar of a user interface, receiving a first user input selecting a first data source from the at least one data source, and causing display of a portion of the first data source in a first chart in a main panel of the UI. The method may further comprise receiving a second user input identifying a portion of the first chart, generating a first filter based on the identified portion of the first chart and displaying an indicator of the first filter in the first sidebar, causing presentation of an indicator of at least one linked object set in the first sidebar of the UI, the at least one linked object set including information linked to the information in the first data source. The method may further comprise receiving a third user input selecting a linked object set, the linked object set linked by an ontology to the first data source by at least one common data type, causing display of the selected linked object set and the first filter in a second sidebar of the user interface, causing graphical display of a portion of the linked object set in a second chart in the main panel, the second chart including depicting information of the linked object set filtered by the first filter. The method may further comprise receiving a fourth user input identifying a portion of the second chart, generating a second filter based on the identified portion of the second chart, and display an indicator of the second filter, and generating and cause display of fields of the linked object set, filtered by the first filter and the second filter, in a third chart in the main panel.

DETAILED DESCRIPTION

Overview

Figure 1:
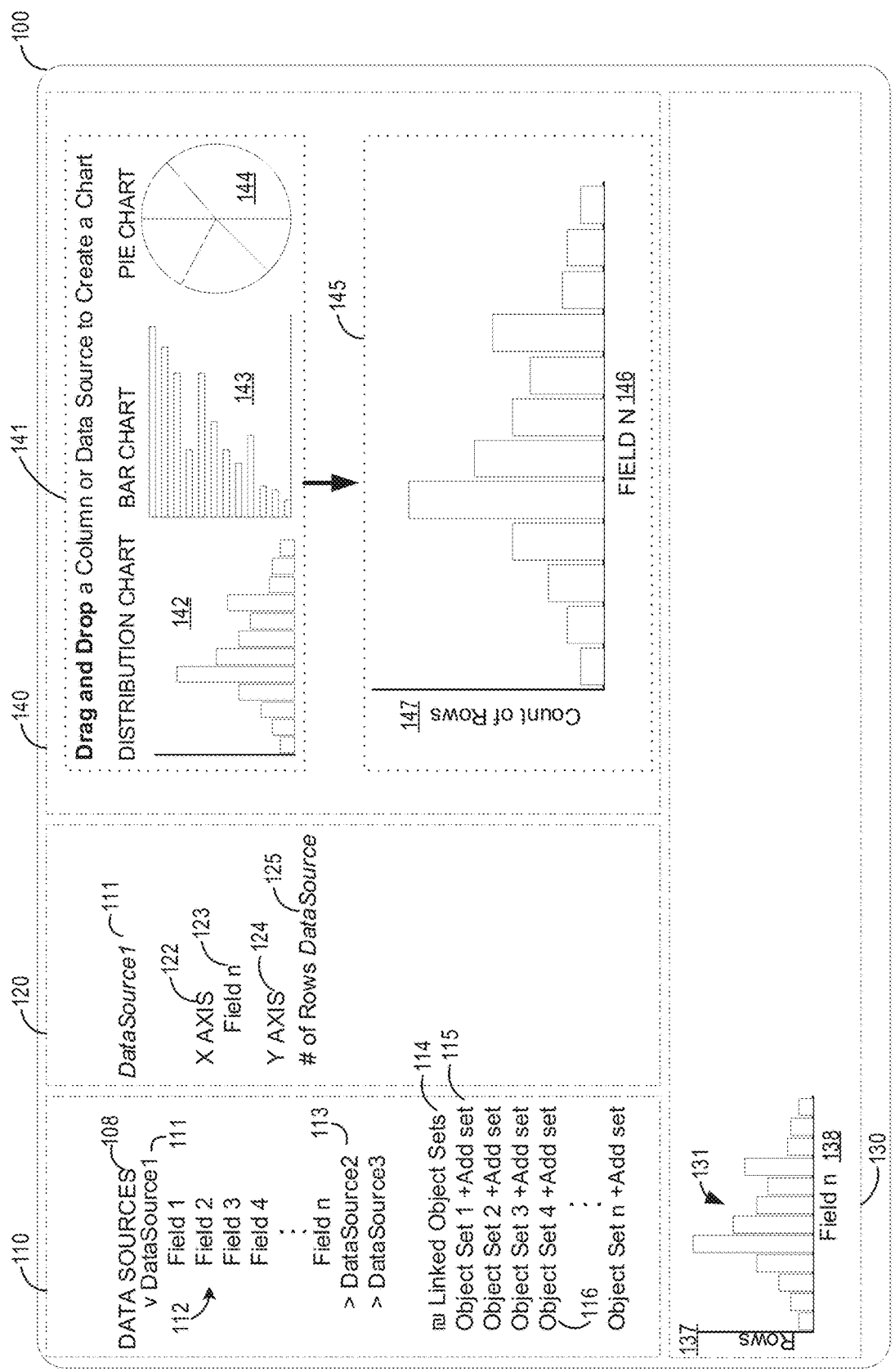
FIG. 1 illustrates one embodiment of an example of a user interface (UI) of a system that generates charts using data sources linked to data object sets by an ontology illustrating, for example, drag-and-drop chart creation options.

To facilitate analyzing large data sets, in particular, using graphical depiction of portions of a data set to help reveal information about the data set to an analyst, a system can be provided displays selected portion of a data source, allows a user to select a portion of the displayed data for further analysis and create a filter (herein referred to as a "cohort") to indicate a segregation of the portion from the data source, and then displays a portion of an object set linked by an ontology to the data source, the object set been filtered by the cohort. Additional filtering of the linked object set can be performed to further segregate desired data. After filtering is done to segregate certain data from a data source and one or more linked object sets, the segregated data may be saved as a new data set which will be the basis for additional analysis on the segregated information.

Such a system may include one or more processors configured to execute a software application that generates and displays a user interface (UI) and workflow for interacting with data sets that are linked based on an ontology, creating charts from those linked data sets, and creating cohorts (filters) that generate updated charts based on the generated cohorts. Providing the functionality to generate and display portions of information of a data source, saving the generated portion as a cohort, and then using that cohort is a way to associate other sets of data that are linked by an ontology (e.g., linked object sets) allows the user to visually/graphically segregate large amounts of data to drill down to desired data that is associated with the original data source and information in the linked object set. After filtering is done to segregate certain data from a data source and one or more linked object sets, the segregated data may be saved as a new data set which will be the basis for additional analysis on the segregated information.

As described in more detail in FIGS. 1-6, the UI may include a first sidebar (or "display portion") listing data sets (or "data sources" or simply "sources") having numerous data fields, a main panel for displaying graphs (or "charts") and tables, a second sidebar positioned between the main panel and the first sidebar that may display filter and chart specific information. The UI may further include a third sidebar/display portion aligned, for example, along a lower portion of the UI (e.g., below the first and second sidebar, and the main panel) that displays a selectable list of chart thumbnails reflecting generated charts of filtered data.

In operation, a user may select a data set in the sidebar, drag and drop a field of the data set into the main panel, and the UI depicts the information in the field of the data set as a chart. A portion of the chart can be selected and defined as a "cohort" (a filter that indicates a portion of a data to be displayed). Generation and use of cohorts and the operations described herein allow desired data to be analyzed in more detail. The cohort may be saved in the first sidebar. Additional cohorts can be defined and applied, singly or in combination, to filter a data set and produce corresponding charts and tables. Information from other linked data sets, which corresponds to the filtered data set, can be displayed in tabular and/or chart format, all facilitated by simple drag and drop operations. At any time, a chart thumbnail in the second sidebar can be selected for display in the main panel, and additional data analysis can begin from that displayed chart.

In one hypothetical example, the data source may be a database that includes all of the licensed drivers of automobiles in the country. The database may include tens of millions of rows, each row associated with a particular person having a license, and numerous columns, each column including a field having certain data relating to the particular person. Such a database may include information identifying the full name of each driver, the state the drivers are licensed in, and various information about each driver, for example, age, gender, race, social security number, passport number, issuance of another form of government ID and associated ID number, current address, previous addresses, mother, father, children, siblings, family members who are also licensed drivers, physical characteristics that may be used to identify the driver, whether the driver wears corrective lenses, whether the driver is an organ donor, if the drivers in the military or has had previous military service, how many years a driver has been licensed, the state where a license is currently issued, states where a license has previously been issued, driving infractions associated with the driver, accidents associated with the driver, passport number, and current employer. An object set linked to the data source may include people's names, social security number, educational information, moving violations, arrests, conviction of felonies, and conviction of misdemeanors, but the object set may not include where a person has a driver's license.

In this example, a data analyst working on an insurance actuary project may start with the data source and want to look for correlations of driving information in the data source for drivers in a certain state and criminal records. In this example, the data analyst may start by creating and saving a cohort that filters the data source to only include drivers from New York. Then, the linked object set can be filtered using the cohort to only show information in the object set related to drivers from New York. Using this set of data the starting point, the data analyst may then further filter the linked object set to only show information of people with moving violations and misdemeanors, but not felonies. The resulting linked data set would include all the information from the data source for people with driver's licenses from New York that also have moving violations and misdemeanors. The resulting linked data set can then be saved off, and used to perform the desired analysis. Normally, because desired information is needed from the data source and another database, generating a data set of the desired resulting information can be non-intuitive, and time-consuming. In addition, the database queries needed to generate the data set of the desired resulting information can be complex and thus time consuming for a data analyst to write. The graphical oriented approach described herein simplifies both the conceptualization of forming the desired resulting information and actually generating the queries necessary to produce the desired resulting information.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Figure 7:
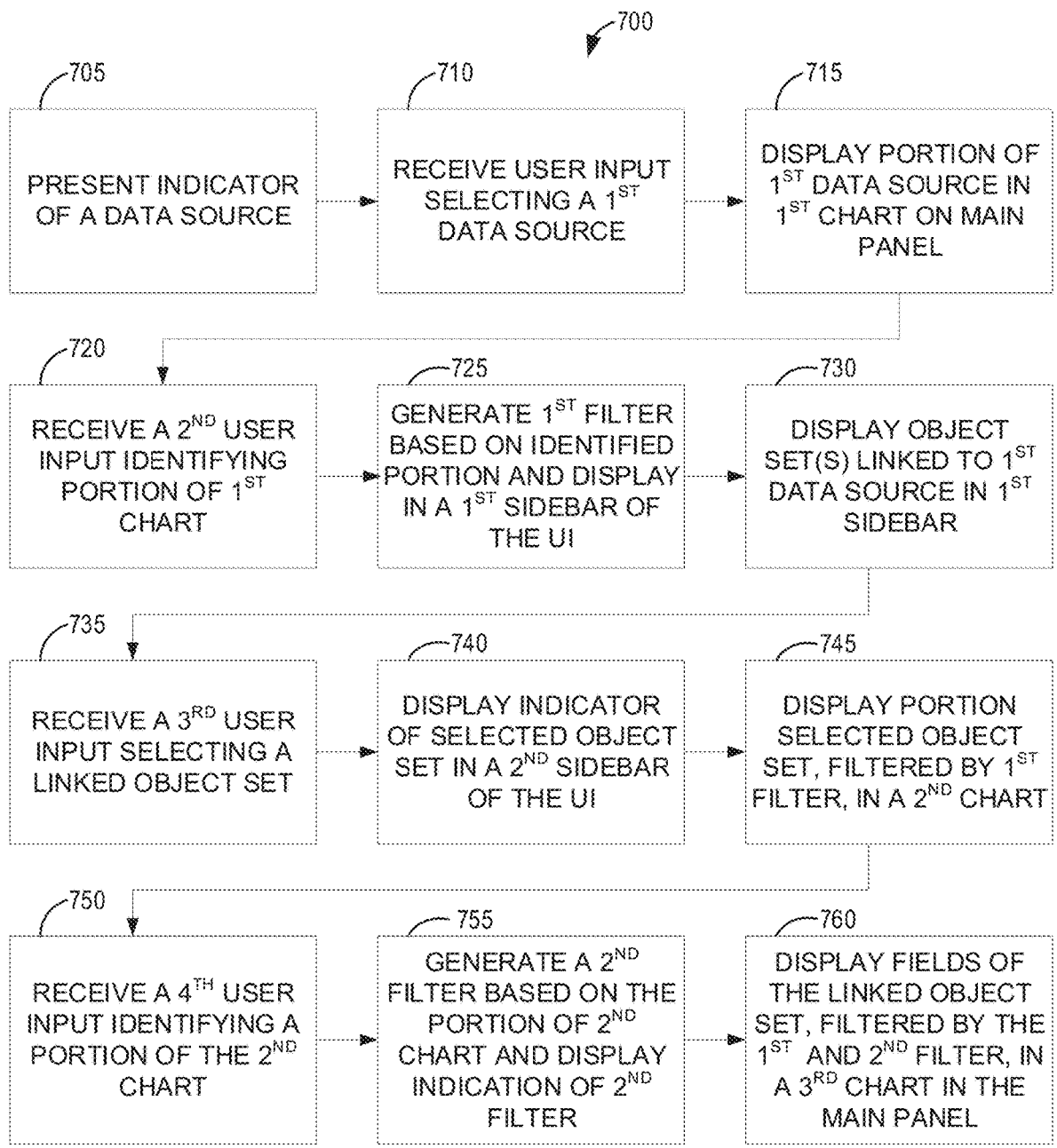
FIG. 7 illustrates an example of a process associated with generating graphs using an ontology-backed data sets.
Figure 8:
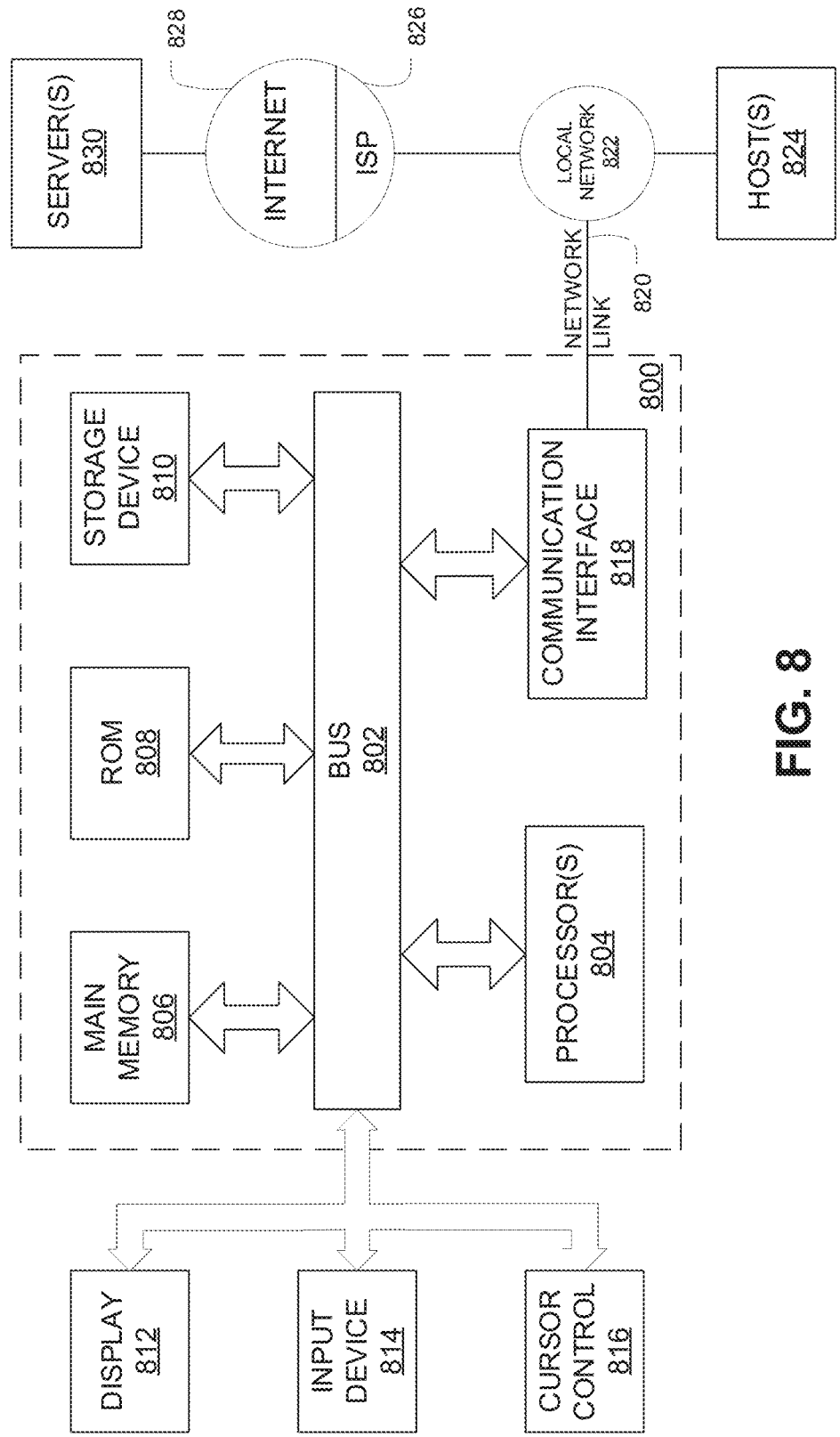
FIG. 8 illustrates a computer system with which certain methods discussed herein may be implemented.

FIG. 1 illustrates one embodiment of an example of a user interface (UI) 100 of a system that can be used to generate charts using data sources linked to data object sets by an ontology. Additional information relating to a database system that includes information linked by an ontology as described in reference to FIG. 9. An example of such a system, including certain hardware components of the system, is illustrated in FIG. 8 and described herein below. FIGS. 1-6 illustrate examples of various features and information that the system can generate and display in the UI 100, including for example, drag-and-drop chart creation options, according to various embodiments. The various aspects of the UI 100 shown in FIGS. 1-6 reflect at least some of the operations that are illustrated in the flowchart of FIG. 7 which depicts an example of a method for graphically filtering data sets linked by an ontology. As will be appreciated by one of ordinary skill in the art, this description and illustration of particular features and information, and the location of such information as portrayed in the UI 100, should not be viewed as limiting the scope of the invention. Instead, the illustrated and described functionality are merely examples of features that may be incorporated into various embodiments. For example, in various embodiments, the displayed items on UI 100 (lists, filters, charts, graphs, etc.) are displayed in other formats but may also include similar functionality as is described herein.

The UI 100 may include a plurality of portions for displaying information related to a data source or a link object set, the chart (or graph), or a table. In the embodiment illustrated in FIG. 1, the UI 100 includes a first sidebar 110, a main panel 140 positioned in a lateral location in the UI 100 relative to the first sidebar 110. UI 100 further illustrates a second sidebar 120 positioned between the first sidebar 110 and the main panel 140, and a third sidebar 130 positioned in the UI 100 below the first sidebar 110, below the second sidebar 120 and below the main panel 140. That is, the third sidebar 130 is displayed in a lower portion of the UI 100 than the first sidebar 110, the second sidebar 120, and the main panel 140. Although FIG. 1 illustrates sidebars 110, 120, 130 in the main panel 140 in particular locations, other embodiments can position the sidebars in other locations of the UI, for example, at a location of a user's preference.

In the embodiment of FIG. 1, the first sidebar 110 displays a list of one or more selectable data sources 108 that may be of interest for a particular analysis to be performed. Each of the data sources may include various fields 112. Each data source (e.g., datasource1 111, datasource2 113, etc.) on the list of selectable data sources 108 may be represented by numerous rows and columns of data, each column representing a particular field of information. Although FIG. 1 illustrates the list of selectable data sources as having three sources (e.g., datasource1, datasource2, datasource3) more or fewer data sources may be displayed in the list of data sources 108. The first sidebar 110 also displays a header of linked object sets 114 followed by a list of the linked object sets 116. Each of the displayed linked object sets 116 includes at least some information that is linked by an ontology to a selected datasource1 111 (e.g., at least one common field). For example, if a particular datasource1 111 is selected from the list of data sources 108, the list of linked object sets 114 may change to reflect the object sets that are linked by an ontology to the particular selected datasource1 111. This is further described in FIG. 10. Each of the linked object sets 116 includes an Add Set indicator 115 that once selected, invokes the use of the linked object set and displays it in the second sidebar 120.

Figure 2:
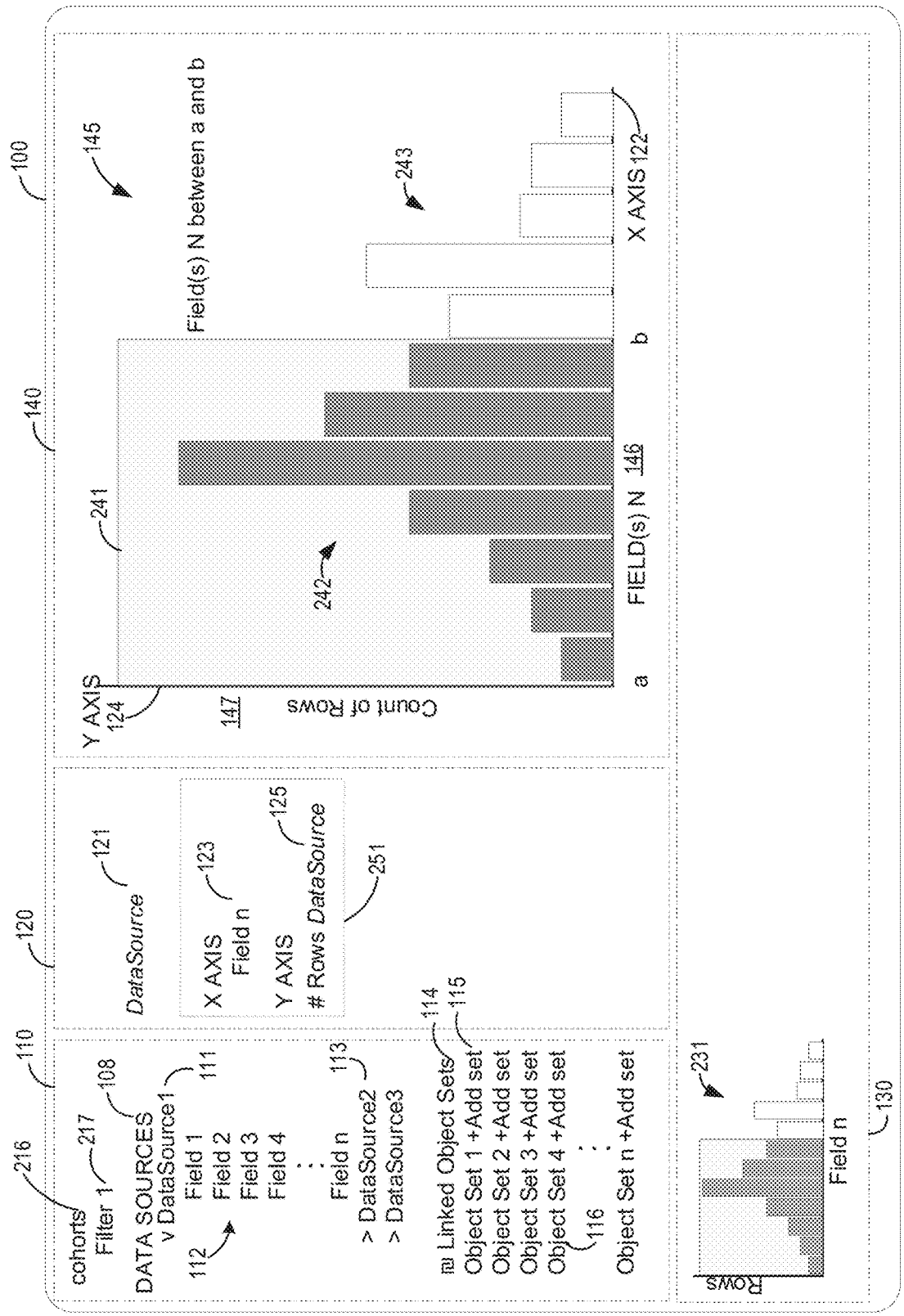
FIG. 2 illustrates one embodiment of an example of a user UI of a system showing, for example, selection of a portion of a chart of a selected data source.

The second sidebar 120 displays a selected datasource1 111, a portion of which will be graphed in the main panel 140. The second sidebar 120 includes a filtering information relating to filtering that is being performed on a selected data source (e.g., data source1 111. The filtering information may be displayed in various ways in various embodiments, as shown in one way in FIG. 2 and another way in FIG. 3. In FIG. 2 the filtering information includes an X-axis field 122 and an identified field 123 to display along the X-axis of the chart that is to be created. The second sidebar 120 also includes a Y-axis field 124 and the information 125 that should be displayed along the Y-axis, for example, the number of rows in the data source 121. In an example of an operation, a data source 121 is selected from the first sidebar 110, and a field 112 of the data source 121 is selected from the first sidebar 110 to be displayed along the X-axis of the chart.

After a data source 121 and a field 123 have been selected, the user can determine what type of chart they desire to display in the main panel 140. In the embodiment illustrated in FIG. 1, the main panel 140 display three chart thumbnail that represent examples of charts 141 that can be created in the main panel 140 simply by dragging and dropping an indicator from the second sidebar onto the desired chart. In this example, a user can select to create either a distribution chart 142, a bar chart 143, or pie chart 144, by dragging and dropping an indicator from the second sidebar 120 onto the desired chart displayed in the main panel 140. In the example illustrated in FIG. 1, the distribution chart 142 thumbnail was selected, which causes a larger chart 145 to be created in the main panel 140. The chart 145 includes fields 146 along the X-axis and a count of rows 147 along the Y-axis. The chart 145 portrays a portion of the information in the data source 121, for example, field 123.

When the chart 145 displayed in the main panel 140, a thumbnail chart 131 of chart 145 is displayed in the third sidebar 130 as a reference for the user to help indicate where they are in the data filtering process.

FIG. 2 illustrates one embodiment of an example of a UI 100 showing, for example, selection of a portion of a chart of a selected data source. In FIG. 2, the main panel 140 shows a chart 145 that was illustrated in the main panel 140 in FIG. 1. However, in FIG. 2, the user has graphically made a selection 241 of a portion 242 of the chart 145. The selection 241 can be made by using a pointing device (e.g., cursor control 816 FIG. 8) to select a portion 242 of chart 145. The selection 241 includes fields a through b (on the X-axis 122) such that a portion 242 of the chart 145 is selected, and a portion 243 of the chart 145 is not selected. When the selection 241 is made, the thumbnail depiction of the chart 231 illustrated in the third sidebar 130 is correspondingly updated to illustrate the selection 241. By making the selection 241, the user graphically invokes a filtering process on a selected data source. For ease of example, in this example datasource1 111 is indicated to be the selected data source from the list of data sources 108. The filtering process filters data source1 111 to only include the fields that are in the selection 241 and exclude the fields that are not in the selection 241.

Still referring to FIG. 2 when the data source 121 is filtered by the user selection 241, a cohort 216 is generated and displayed in the first sidebar 110 as filter 217. In other words, through the graphical selection 241 of a portion of chart 145 that represents data source 121, a subset of information of data source 121 is defined (e.g., filter 217), displayed, and can be subsequently used in subsequent processing.

Figure 3:
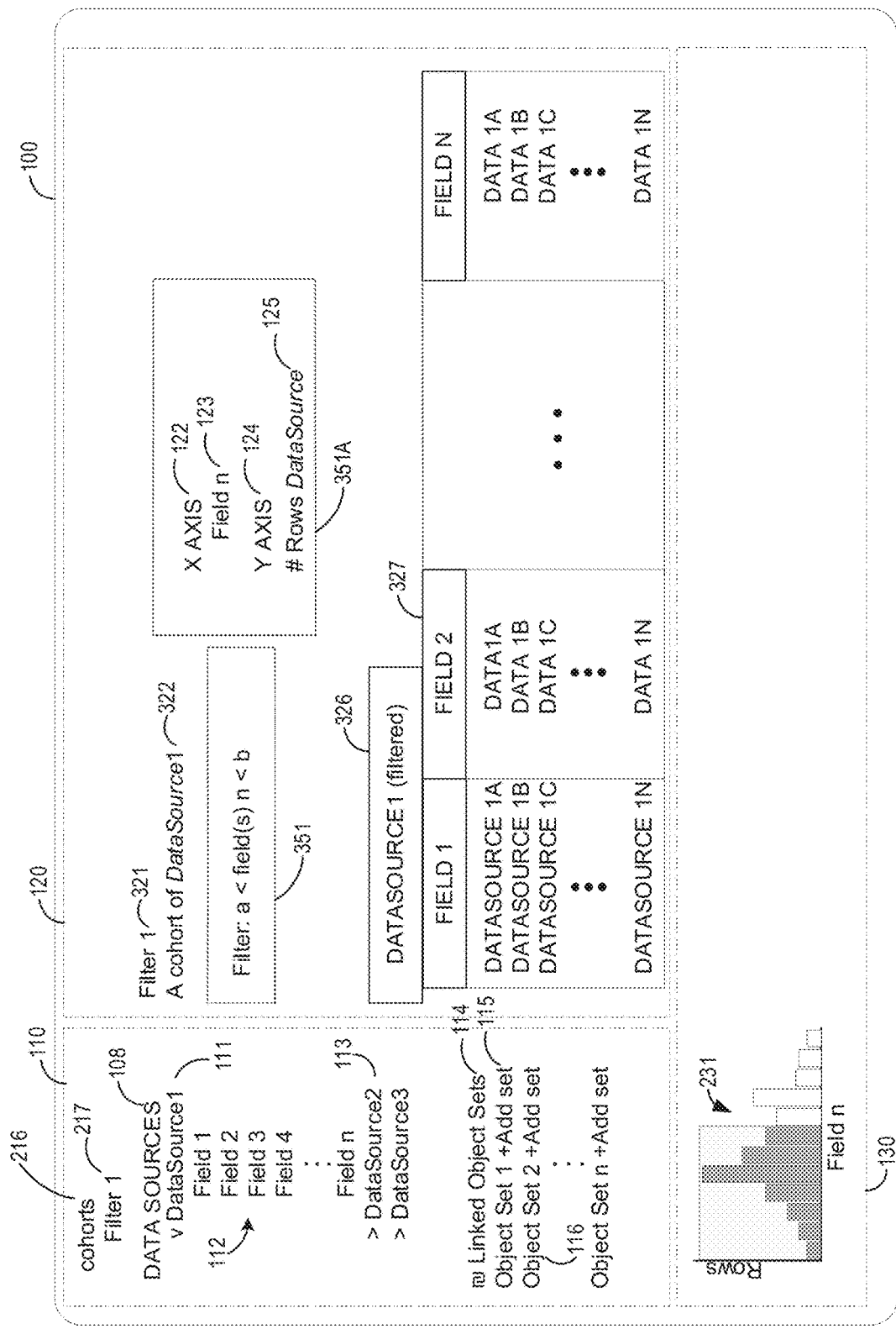
FIG. 3 illustrates one embodiment of an example of a (UI of a system showing, for example, a generated cohort indicator displayed in a first sidebar and the use of the cohort to produce a table of the filtered data source the table including data source information resulting in filtering by the cohort.

FIG. 3 illustrates one embodiment of an example of UI 100 showing, for example, a generated cohort 217 indicator displayed in a first sidebar 110 and the use of the cohort 217 to produce a table 327 of the filtered data source, the table including data source information resulting in filtering by the cohort 217. In FIG. 3, the second sidebar 120 illustrates a table 327 (note: only a portion of the table is illustrated) that may be optionally generated and which represents filtered data source 326, that is, the data source 121 illustrated in FIG. 2 that has been filtered in accordance with the generated cohort, filter 217. The second sidebar 120 displays a filter indication 321 of the filter that is currently being used, and indicates the data source 322 that is being filtered by the filter. The second sidebar 120 also indicates filtering information 351 identifying the field(s) n being selected (e.g., selected by filtering). For example, as illustrated in FIG. 3, the filtering information 351 includes the filtering information "Filter: a<field(s) n<b" indicating that data source 1 322 is being filtered to select the fields between "a" and "b" on the X-axis 122, as illustrated in FIG. 2. The illustration of the filtering information 351 in FIG. 3 is one example of how filtering information may be presented on UI 120. Other ways of presenting the filtering information may be used in other embodiments. In some embodiments, instead of providing indicia of the filtering as shown in filtering information 351, indicia of the filtering may be shown as illustrated in filtering information 351A, which indicates the number of filtered fields 123 of the X-axis 122 and the number of filtered rows 125 of the Y-axis 124. In other embodiments, the filtering information may be provided in other ways, for example, similarly to filtering information 351 illustrated in FIG. 3. This information in the second sidebar 120 may be used if the user selects to generate a chart (not shown in this example) depicting the selected data source filtered by the cohort with certain fields 123 displayed in the chart. Also as illustrated in FIG. that 3, the third sidebar 130 continues to display a thumbnail chart 231 indicating the portion of the data source that is being filtered by the generated cohort 217.

Figure 4:
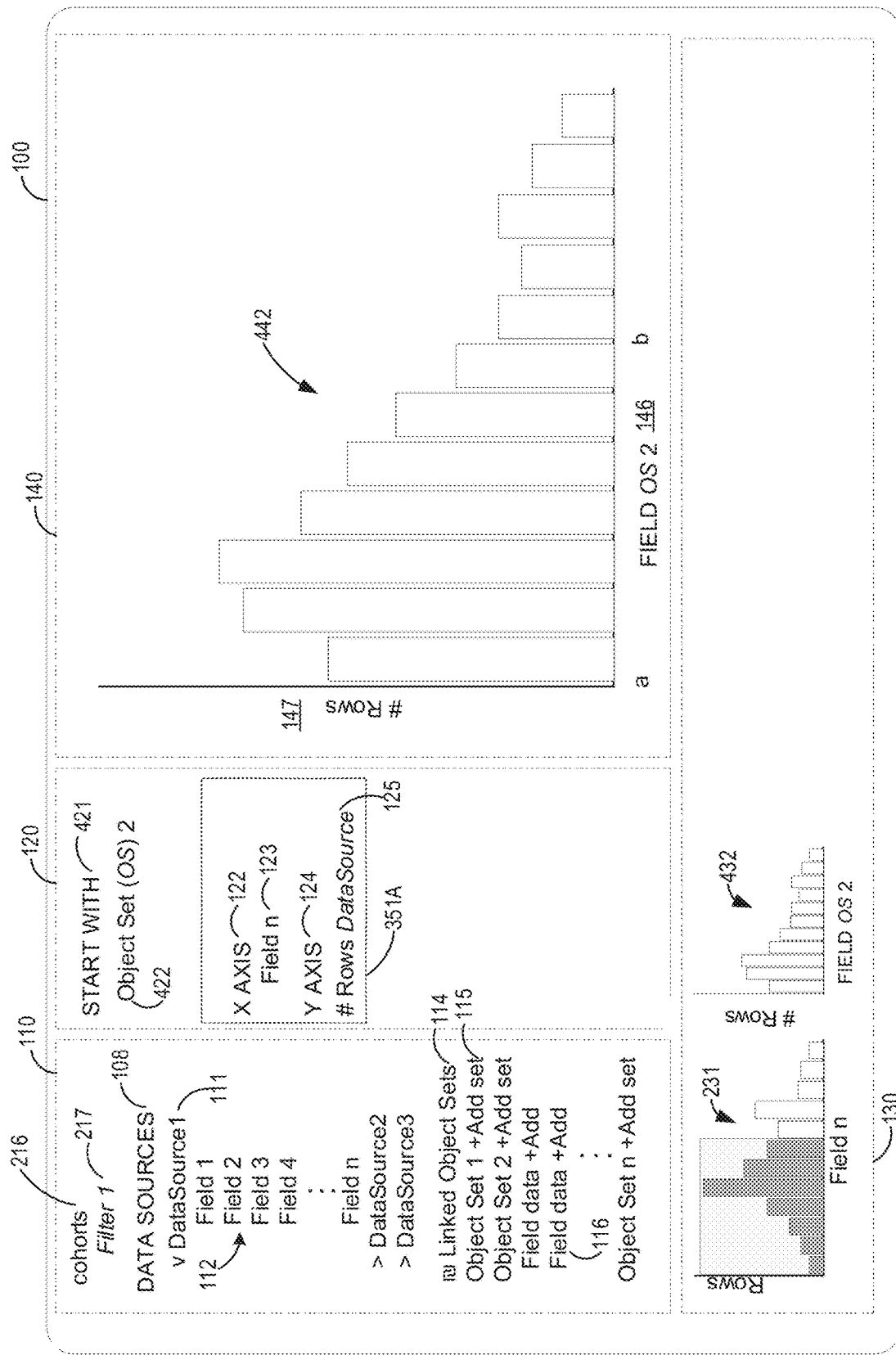
FIG. 4 illustrates one embodiment of an example of a UI of a system showing, for example, a first sidebar, a second sidebar, a main panel displaying a chart, and the third sidebar positioned, in this example, below the first sidebar, the second sidebar, and the main panel of the UI, the second sidebar displaying information related to the chart displayed in the main panel, the chart illustrating a portion of an object set linked to the selected data source.

FIG. 4 illustrates examples of additional information that may be displayed in UI 100, and additional functionality that may be facilitated by UI 100. In this example, the first sidebar 110 displays information relating to a generated cohort 217, one or more data sources 108, and one or more linked object sets 114, similar to that shown in FIG. 3. The second sidebar 120 displays information of a chart 442 that is displayed in the main panel 140. The information in the second sidebar 120 includes START WITH information 421 indicating the starting point for the chart 442, which in this example is linked object set 2 422. The second sidebar 120 also includes information relating to the X-axis 122 and the Y-axis of the chart 442. To generate chart 442, a particular field of the object set can be selected for the X-axis of chart 442, and the selected field 123 is displayed in the second sidebar 120. In one embodiment, the particular field of the object set can be selected by selecting the field from the list of fields for the object set displayed in the first sidebar 110 (e.g., selecting the +Add indicator), and dragging the selected field to the second sidebar 120. The second sidebar 120 also illustrates that, in this example, the Y-axis 124 depicts the #rows for the indicated field 123. In this way, a portion of an object set 422 that is linked to the data source can be displayed in chart 442 in the main panel 140.

After chart information is selected and displayed in the second sidebar 120, and the UI 100 generates the chart 442, the third sidebar 130 generates and displays a thumbnail chart 432 that represents the chart 442 displayed in the main panel 140. The third sidebar 130 continues to display the thumbnail chart 231 representing filtered data and the generated cohort 217. A user may decide to go back to the filtered data set that corresponds to the thumbnail chart 231 at any time that the thumbnail chart 231 is displayed in the third sidebar 130. Similarly, a user may decide to go to the filtered data set that corresponds to the thumbnail chart 432 at any time that thumbnail chart 432 is displayed in the third sidebar 130. Accordingly, the thumbnail charts displayed in the third sidebar provide the functionality to a user to start, or restart, filtering at the point depicted by the thumbnail chart, by, for example, selecting the desired thumbnail chart in the third sidebar 130.

Figure 5:
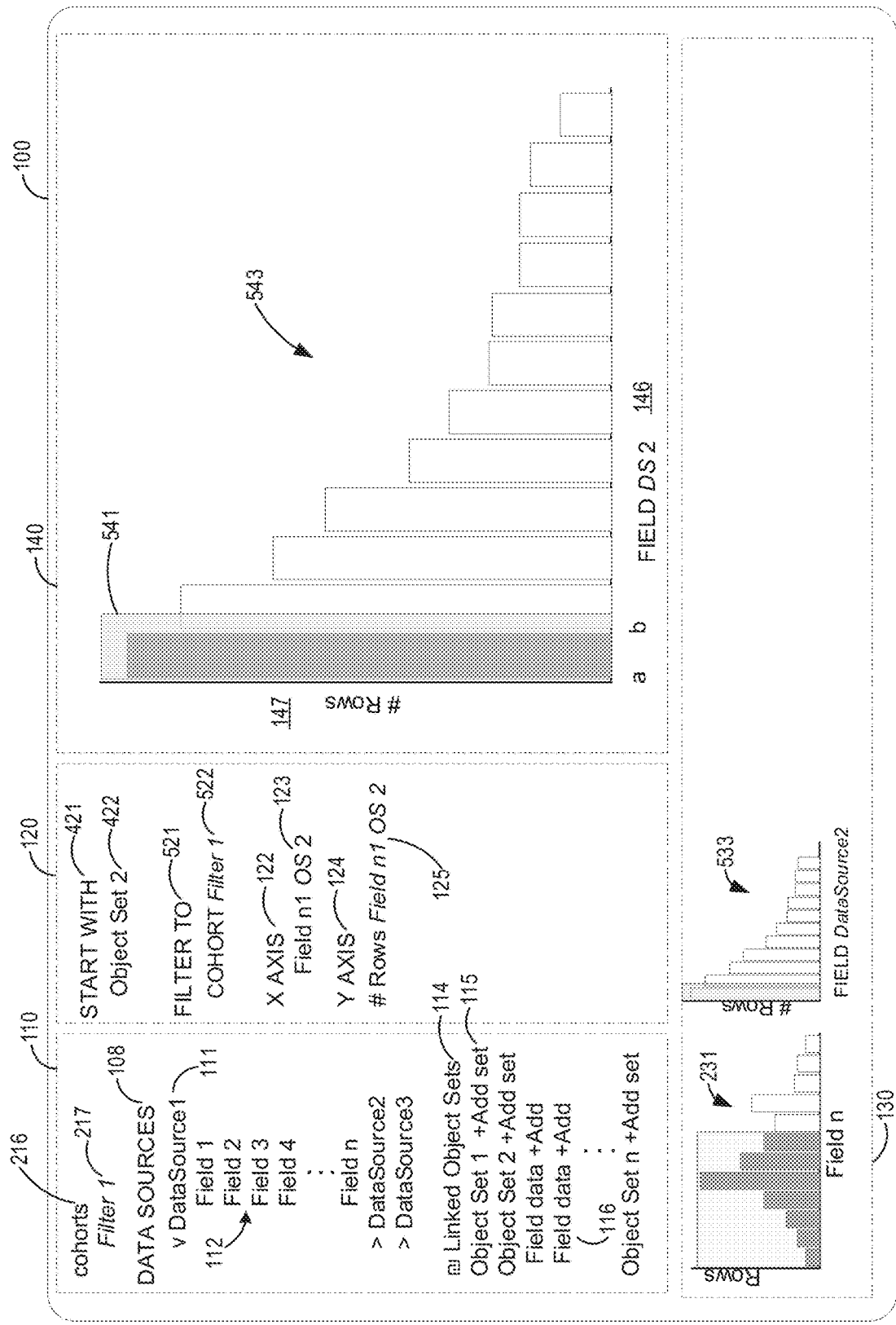
FIG. 5 illustrates one embodiment of an example of a UI of a system showing, for example, selection of a portion of the chart illustrated in FIG. 4 that was filtered by a cohort.

FIG. 5 illustrates one embodiment of an example of a UI 100 showing, for example, selection of a portion of the chart illustrated in FIG. 4 that was filtered by a cohort. In FIG. 5, the first sidebar 110 displays information similar to that displayed in FIG. 4. For example, the first sidebar 110 displays a list of the cohorts 217 that have been generated relating to the selected data source. The second sidebar 120 displays information relating to the chart 543 which is displayed in the main panel 140. The second sidebar indicates information that shows the starting point for chart 543, including START WITH 421 information indicating object set 2 422. In other words, the data set that is used as a starting point to generate chart 543 is linked object set 2 (which is also displayed in the first sidebar 110 under the list of linked object sets 114). The second sidebar 120 also displays an indicator of a filter 522, under the heading FILTER TO 521, that has been used on the Object Set 2 422 to produce chart 543. In other words, Object Set 2 422 was used as the starting data set and then filtered in accordance with cohort filter 217, which was previously generated as described in reference to FIG. 2. The second sidebar 120 in FIG. 5 may also display filtering information. As illustrated in FIG. 5, the displays X-axis 122 information that indicates the field 123 displayed along the X-axis of chart 543, and Y-axis 124 information that indicates that information 125 (e.g., #rows) that is displayed along the Y-axis of chart 543. Accordingly, a user may graphically select the object set to start with and a cohort to use (if there are several cohorts to select from) by selecting the desired object set and cohort in the first sidebar 110 and dragging it to the second sidebar 120 to the corresponding START WITH 421 or FILTER TO 521 field. In other embodiment, the filtering information may be provided in other ways, for example, similarly to filtering information 351 illustrated in FIG. 3.

Accordingly, in the example illustrated in FIG. 5, chart 543 represents a portion of the information in Object Set 2 that has been filtered by cohort 522. The main panel 140 also illustrates a selection 541 of a portion of chart 543. A user can make such a selection by using a user input device (e.g., a pointing device such as a mouse, touchpad or the like) to indicate a selected portion of chart 543. In some embodiments, a user can also make such a selection by entering input (e.g., a range of data values) in a menu (not shown). With the selection 541, a user graphically indicates filtering to be done on the selected object set, in addition to the filtering being performed by the selected cohort 522. When the selection 541 is made, the third sidebar indicates a chart thumbnail 533 depicting the selected filtering.

Figure 6:
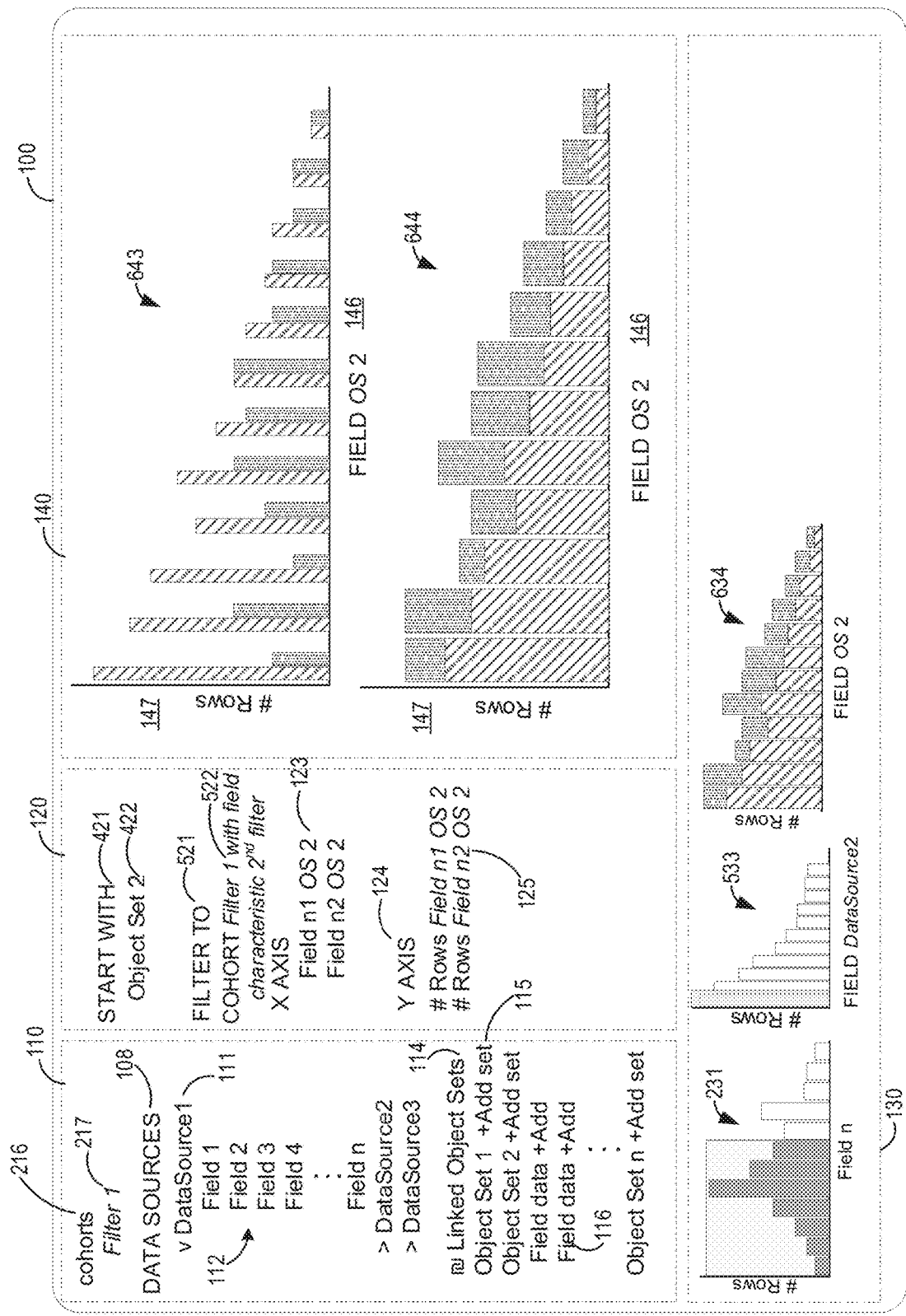
FIG. 6 illustrates one embodiment of an example of a UI of a system showing, for example, in object set filtered by a first cohort and an additional filtering operation (e.g., as illustrated in FIG. 5), and also illustrating that the resulting data may be displayed in different types of charts.

FIG. 6 illustrates one embodiment of an example of a UI 100 showing, for example, in object set filtered by a first cohort and an additional filtering operation (e.g., as illustrated in FIG. 5), and also illustrates that the resulting data may be displayed in different types of charts. In FIG. 6, the first sidebar 110 displays similar information is displayed in FIG. 5 and the second sidebar 120 displays information related to the combination of filtering that is being performed. For example, sidebar 120 illustrates in the field START WITH 421 that the data started with for the chart generation was Object set 2 422. Sidebar 120 further illustrates in the filter field 522 under FILTER TO 521, that the chart displayed in the main panel 140 is a result of filtering Object Set 2 with cohort 217, and additionally filtering with a second characteristic (e.g., that was generated in reference to FIG. 5). In other embodiment, filtering information may be provided in other ways, for example, similarly to filtering information 351 illustrated in FIG. 3. The ontology backed linked data in the selected data source and the selected linked object set 422 allows the selected linked object set 422 to be first filtered using a cohort 217 that is associated with the selected data source, and then provide additional filtering of the object set by a graphical selection by a user of a portion of the filtered object set, as described in reference to FIG. 5.

To illustrate an example of two different charts that may be displayed as a result of the filtering in FIG. 6, the main panel 140 in FIG. 6 depicts a first chart 643 that illustrates the comparison of two fields in a side-by-side column format, and a second chart 644 that depicts the comparison of the same two fields in a stacked column format. Also in this example, the second sidebar 120 indicates the corresponding fields that are illustrated in charts 643 and 644. In operation, a user may select the type of chart to display by a drag-and-drop input onto one of two or more icons that are displayed in the main panel 140, each icon corresponding to one of the types of charts that can be displayed.

Still referring to FIG. 6, the third sidebar 130 now displays a thumbnail chart 634 that corresponds to the chart 644 that was selected to be displayed in the main panel 140. The third sidebar 130 continues to display previously filtered thumbnail chart 231 and thumbnail chart 533, in addition to thumbnail chart 634. If a user decides to go back to a data set at the filtering point indicated by any of these thumbnail charts, the user may select the desired thumbnail chart in the third sidebar 130, and the UI 100 will display data in the main panel 140 and the second sidebar 120 corresponding to the selected thumbnail chart, and the user can continue filtering operations and analysis from that point.

When the user has determined that sufficient filtering has occurred to define a desired data set for further analysis (e.g., for a particular data analyst project), the filtered data set can be saved, and subsequently accessed for the analysis.

In some embodiments, an alert and/or notification is automatically transmitted to the user via the UI 100 when a data source or linked object set that is currently being used has been changed, alerting the user that the data they are using for generating a filtered data set may need to be updated such that it includes all the latest data. Such an alert and/or notification can be transmitted to the system displaying the UI at the time that the alert and/or notification is generated, or at some determined time after generation of the alert and/or notification. When received by the system, the alert and/or notification can cause the device to display the alert and/or notification via the activation of an application on the device (e.g., UI 100), or via another device. For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

FIG. 7 illustrates an example of a process 700 associated filtering data using graphical interfaces for ontology-backed data sets. Process 700 is one possible process by which the system may determine a filtered data set via interactions with a user, and which process generally follows the operations depicted in, and described in reference to, FIGS. 1-6.

At block 705, the process 700 presents an indicator of a data source. The data source indicator may be presented in the first sidebar 110 as one of the one or more data sources 108, as shown in FIG. 1. The data source represents a collection of data that may depicted in tabular rows and columns. The data source may be extremely large, having tens of thousands, millions, tens of millions, or hundreds of millions or more rows, and a plurality of columns, each column indicating a certain field of data.

At block 710, the process 700 receives a first user input selecting one of the one or more displayed data sources as a first data source for processing. Referring again to FIG. 1, the one or more displayed data sources 108 are selectable by a user, for example, using a user pointing device using, for example, a mouse, touchpad, keyboard, etc. The UI 100 is configured to sense such input of a displayed data source.

At block 715, the process 700 displays a portion of the selected first data source in a first chart on the main panel 140 of the UI 100. FIG. 1 illustrates an example of the operation of the process 700 at block 715, displaying a portion of a data source 121 in a first chart 145. For example, the portion of the data source 121 displayed may be a field 123 represented along the X-axis, and a count of the number of rows 125 of the data source corresponding to such a field 123 being displayed along the Y-axis of the first chart.

At block 720, the process 700 receives a second user input identifying a portion of the first chart. An example of a user input is selection 241, as illustrated in FIG. 2. The second user input may be received from a user pointing device, for example, where a selection 241 of a portion of the chart is made by clicking and dragging a bounding box around a desired portion of the chart in the main panel 140.

At block 725, process 700 generates a first filter based on the identified portion of the chart and displays the filter in the first sidebar 110 of the UI 100. FIG. 2 illustrates displaying the filter 217 (under cohort 216) in the first sidebar 110. At block 730, the process 700 displays one or more object sets that are linked to the first data source in the first sidebar. The one or more object sets are linked to the first data source by an ontology. The first data source and the object set have at least one common field (e.g., person's name) that is associated, thus allowing data associated with the common field of the first data source to also be associated with data associated with a common field of the linked object set, and vice versa. In some embodiments, the first data source and an object set may have more than one common field. This may be useful for example to resolve issues where one of the common fields has redundant data in either the first data source or the linked object set, for example, the same person's name. If the first data source in the object set have more than one common field, one or more of the common fields may be used to determine the correct linking between the two data sets.

Still referring to FIG. 7, at block 735, process 700 receives a third user input selecting a linked object set. The selected linked object set is linked to the first data source. The third user input can be made with a point-and-click device to select one of the linked object sets that are displayed in the first sidebar 110.

At block 740 the selected object set is displayed in a second sidebar 120 of the UI 100. An example of this block operation is shown in FIG. 4, where object set 2 422 is displayed in the second sidebar 120. At block 745, the process 700 displays a portion of the selected object set filtered by the first filter in a second chart. An example of the processing of block 740 is illustrated in FIG. 5. In FIG. 5, object set to 422 is displayed in the second sidebar 120, and the second sidebar 120 indicates that object set 2 422 is filtered using a selected cohort 522.

At block 750, process 700 receives a fourth user input, the fourth user input identifying a portion of the second chart. The 4$^{th}$ user input may be made using an input pointing device such as a mouse, touchpad, or the like. FIG. 5 illustrates an example of receiving a 4$^{th}$ user input as a selection 541 of a (second) chart 543 displayed in the main panel 140. Although FIG. 5 illustrates the selection 541 of a portion of the chart along the Y-axis, any portion of the chart may be selected by, for example, defining a bounding box around the desired portion of the chart using an input device.

At block 755, process 700 generates a second filter based on the portion of the second chart, and displays an indication of the second filter. When the user selects a portion of the second chart, the system determines the fields in the object set that are associated with the selection, and provides filtering of the object set based on the selection. At this point, and for other previous filtering of the data source or the object set, the filtering that is performed may not actually delete any data from the data source or the object set. Instead, the selection of certain portions of displayed charts creates filters that are applied to the data source or the object set, and then can be subsequently used to filter either the data source or the object set, respectively. The UI facilitates the automatic creation of the desired filters by the system based on the user input (e.g., selection of portions of a chart, selections of a field from a list of fields, etc.). This provides a much more intuitive interface for data analyst to quickly drill down into a large data set to segregate information needed for further analysis, and obviates the need for the user to write complex database queries to create such filters.

At block 760, process 760 displays fields of the linked object set, filtered by the first and second filter, in a third chart in the main panel. FIG. 6 illustrates one example of this functionality. The second sidebar 120 illustrates a starting object set 422, a cohort that is used to filter the object set, and additional filtering that was performed by selecting a portion of the second chart (e.g., in block 755). The third chart (e.g., 643 or 644) is displayed in the main panel 140, in a format selected by the user. FIG. 6 illustrates two different formats for such a chart, however, other formats are also possible. At this point in the process 700, the data set associated with the third chart may be saved for further analysis. In some embodiments, a data set generated by any other filtering of the data source or a linked object set using one or more cohorts, and/or any of the filtering functionality described herein, may be saved for further analysis.

FIG. 8 is a block diagram that illustrates an example of a computer system 800 upon which various embodiments may be implemented. That is, in various examples, the UI 100 may be implemented on such a computer system 800. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. The main memory 806 may, for example, include instructions to implement a user interface, for example, UI 100 as illustrated in FIG. 1, receive user input via the user interface selecting a data source, a linked data object, one or more fields, or portions of charts, and generate filters corresponding to the user selections, and display data sets in charts based on the generated filters, as described in FIGS. 1-6, Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. Accordingly, in some embodiments, of the computer system 800, the computer system comprises having a first non-transitory computer storage medium configured to store two or more data sets each representable in tabular rows and columns format, the two or more data sets relationally-linked based on an ontology, a second non-transitory computer storage medium configured to at least store computer-executable instructions, and one or more computer hardware processors in communication with the second non-transitory computer storage medium. The one or more computer hardware processors configured to execute the computer-executable instructions to at least cause presentation of an indicator of at least one data source in a first sidebar of a user interface, receive a first user input selecting a first data source from the at least one data source, generate and cause display of a portion of the first data source in a first chart in a main panel of the UI, receive a second user input identifying a portion of the first chart, generate a first filter based on the identified portion of the first chart and display an indicator of the first filter in the first sidebar, cause presentation of an indicator of at least one linked object set in the first sidebar of a user interface (UI), the at least one linked object set including information linked to the information in the first data source, receive a third user input selecting a linked object set, the linked object set linked by an ontology to the first data source by at least one common data type, generate and cause graphical display of the selected linked object set and the first filter in a second sidebar of the user interface, generate and cause graphical display of a portion of the linked object set in a second chart in the main panel, the second chart including depicting information of the linked object set filtered by the first filter, receive a fourth user input identifying a portion of the second chart, generate a second filter based on the identified portion of the second chart, and display an indicator of the second filter, and generate and cause display of fields of the linked object set, filtered by the first filter and the second filter, in a third chart in the main panel.

Object-Centric Data Model

Figure 9:
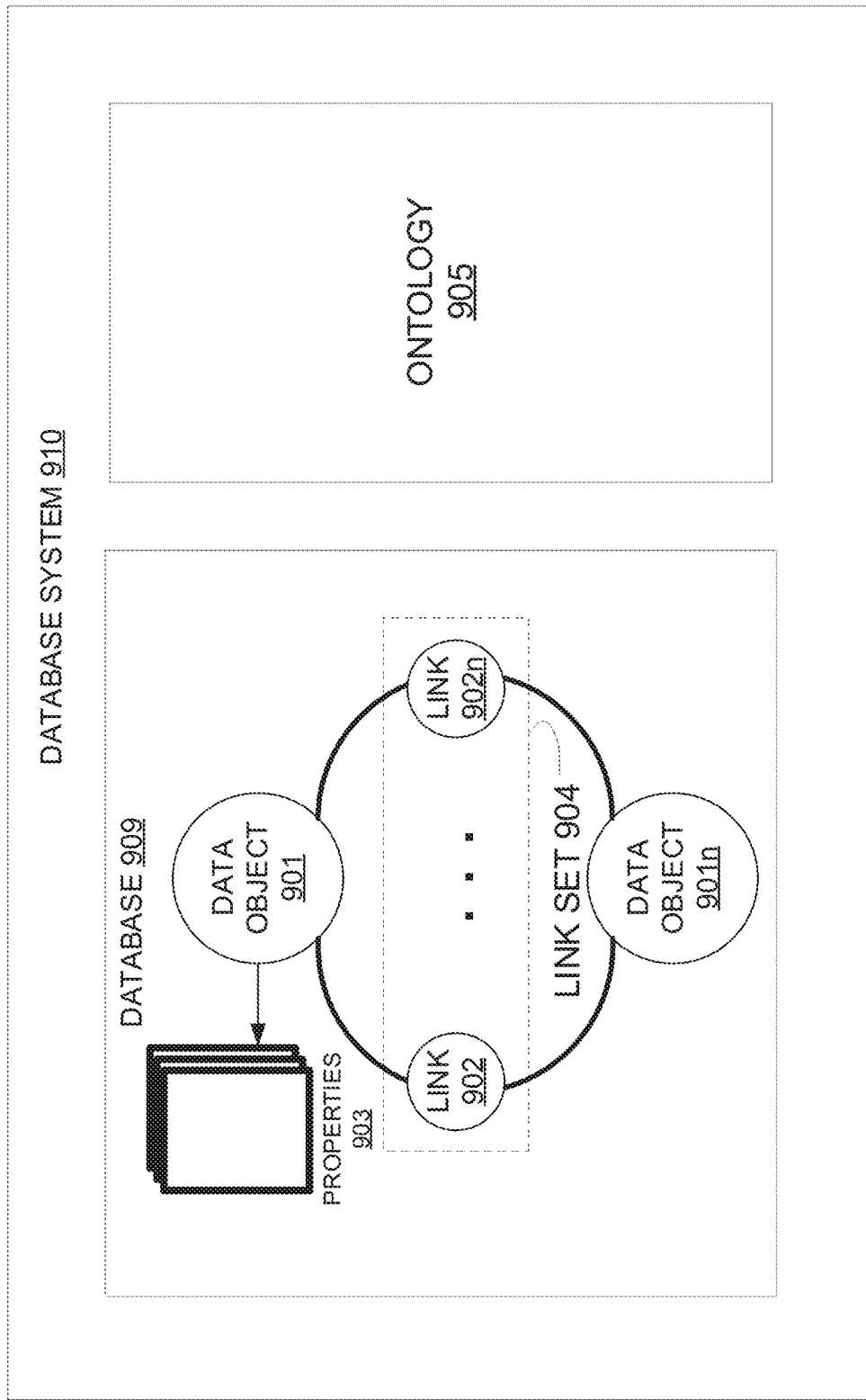
FIG. 9 illustrates one embodiment of a database system using an ontology.

FIG. 9 illustrates one embodiment of a database system using an ontology. To provide a framework for the following discussion of specific systems and methods described herein, an example database system 910 using an ontology 905 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 905. In some embodiments, the body of data includes one or more data sources and object sets that are illustrated in FIG. 1. The conceptual data model is independent of any particular database used for durably storing one or more database(s) 909 based on the ontology 905. For example, each object of the conceptual data model may correspond to one or more rows in a relational database or an entry in Lightweight Directory Access Protocol (LDAP) database, or any combination of one or more databases.

FIG. 9 illustrates an object-centric conceptual data model according to an embodiment. An ontology 905, as noted above, may include stored information providing a data model for storage of data in the database 909. The ontology 905 may be defined by one or more object types, which may each be associated with one or more property types. At the highest level of abstraction, data object 901 is a container for information representing things in the world. For example, data object 901 can represent an entity such as a person, a place, an organization, a market instrument, or other noun. Data object 901 can represent an event that happens at a point in time or for a duration. Data object 901 can represent a document or other unstructured data source such as an e-mail message, a news report, or a written paper or article. Each data object 901 is associated with a unique identifier that uniquely identifies the data object within the database system.

Different types of data objects may have different property types. For example, a "Person" data object might have an "Eye Color" property type and an "Event" data object might have a "Date" property type. Each property 903 as represented by data in the database system 910 may have a property type defined by the ontology 905 used by the database 905.

Objects may be instantiated in the database 909 in accordance with the corresponding object definition for the particular object in the ontology 905. For example, a specific monetary payment (e.g., an object of type "event") of US$30.00 (e.g., a property of type "currency") taking place on Mar. 27, 2009 (e.g., a property of type "date") may be stored in the database 909 as an event object with associated currency and date properties as defined within the ontology 905. The data objects defined in the ontology 905 may support property multiplicity. In particular, a data object 901 may be allowed to have more than one property 903 of the same property type. For example, a "Person" data object might have multiple "Address" properties or multiple "Name" properties.

Each link 902 represents a connection between two data objects 901. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 901 can have multiple links with another data object 901 to form a link set 904. For example, two "Person" data objects representing a husband and a wife could be linked through a "Spouse Of" relationship, a matching "Address" property, and one or more matching "Event" properties (e.g., a wedding). Each link 902 as represented by data in a database may have a link type defined by the database ontology used by the database.

The ontology may be configured, and data in the data model populated, by a system of parsers and ontology configuration tools. In some examples, data source input data may be provided to a parser. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser is able to read a variety of source input data types and determine which type of data it is reading, instantiate one or more data objects 901 in the database 909, each of the objects 901 having one or more properties 903 that are instantiated based on property types. Two data objects 901 may be connected by one or more links 902 that may be instantiated based on link types.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

In various implementations, data objects in ontology 905 stored in database 909, may be stored as graphs. The graphs may include, for example, an undirected graph comprising nodes and the lines connecting the nodes represent relationships. In another example, data may be stored in clusters which may be considered as a set of graphs which may be disjoint. Data also may be stored in an adjacency list which may be used to represent a graph or cluster, allow storing of graphs in memory efficiently, particularly where the graphs are lightly-connected graphs or clusters (e.g., graphs or clusters wherein the number of nodes is high compared to the number of linkages per node). Data may also be stored in an adjacency matrix, which may also be used to represent a graph or cluster. Advantageously, adjacency matrices may allow for more efficient storage and processing of highly-connected graphs or clusters, e.g. where the number of connections per node is comparable to the number of nodes. Adjacency matrices may also allow for more efficient access and processing, particularly vectorized access and processing (e.g. using specialized hardware or processor instructions for matrix math), to the graph or cluster data because each matrix row corresponding to a node may have the same size irrespective of the number of linkages by node.

As described here, various data items may be stored, processed, analyzed, etc. via graph-related data structures, which may provide various storage and processing efficiency advantages described. Advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc. The nodes of a graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (e.g., node list) representation Various third-parties operate electronic services systems. In some instances, these systems may allow access through Application Programming Interfaces (APIs). Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

In an implementation the database system 910 (or one or more aspects of the database system 910) may comprise, or be implemented in, a "virtual computing environment." As used herein, the term "virtual computing environment" should be construed broadly to include, for example, computer readable program instructions executed by one or more processors (e.g., as described below in the example of FIG. 8) to implement one or more aspects of the modules and/or functionality described herein. Further, in this implementation, one or more modules of the database system 910 may be understood as comprising one or more rules engines of the virtual computing environment that, in response to inputs received by the virtual computing environment, execute rules and/or other program instructions to modify operation of the virtual computing environment. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the database system 910 as a virtual computing environment may advantageously enable executing different aspects or modules of the system on different computing devices or processors, which may increase the scalability of the system. Implementing one or more aspects of the database system 902 as a virtual computing environment may further advantageously enable sandboxing various aspects, data, or modules of the system from one another, which may increase security of the system by preventing, e.g., malicious intrusion into the system from spreading. Implementing one or more aspects of the database system 910 as a virtual computing environment may further advantageously enable parallel execution of various aspects or modules of the system, which may increase the scalability of the system. Implementing one or more aspects of the database system 910 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

In various embodiments, outgoing requests and/or incoming responses may be communicated in any suitable formats. For example, XML, JSON, and/or any other suitable formats may be used for API requests and responses. In some implementations, the system may advantageously, as described above, convert data from one format to another (e.g., based on templates) to enable communications with multiple third-parties and API. Such implementations may be particularly advantageous as the system is enabled to scale and communicate via ever more disparate API's over time, and be easily adapted to changes in existing API's as needed.

Additionally, in some implementations communications with one or more API's may be encrypted and/or authenticated. For example, public and/or private key exchanges may take place to establish authenticated and/or encrypted communications between, e.g., the system and computing systems of third-parties, to, e.g., protect user data from exposure to potentially malicious actors.

Figure 10:
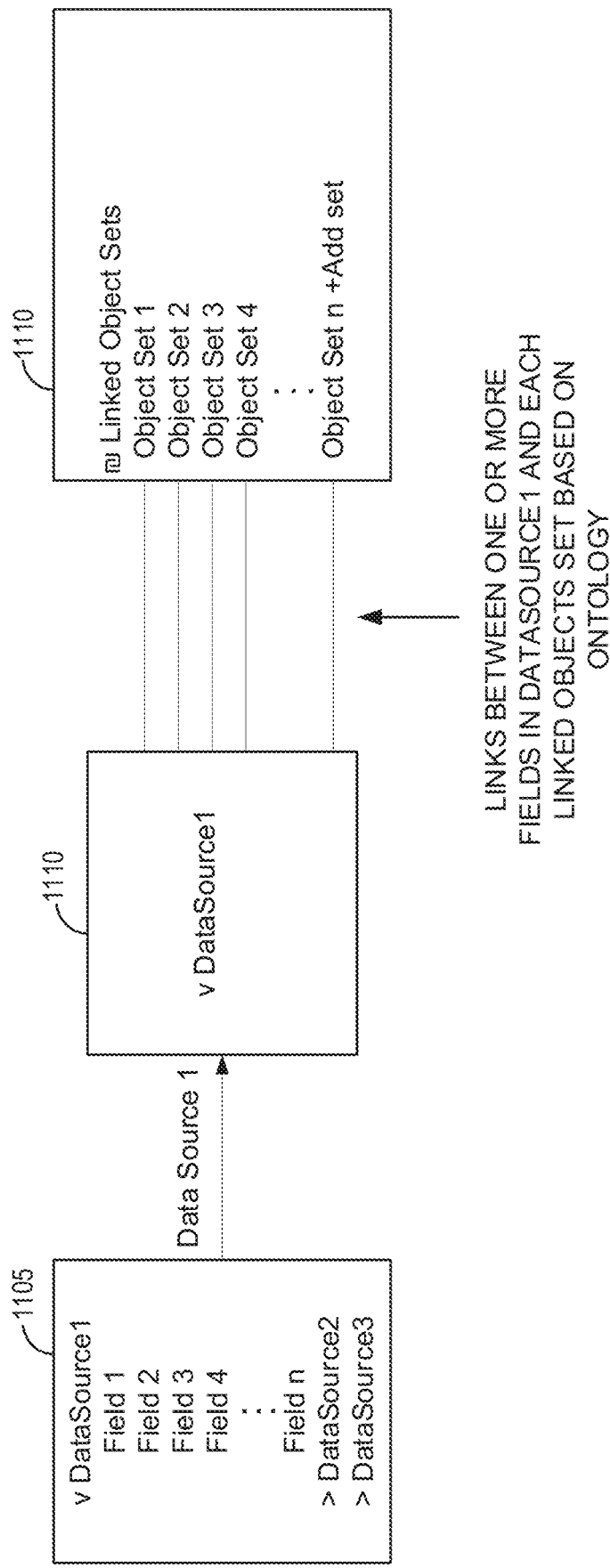
FIG. 10 illustrates an example of relationships between one or more selected data sources and linked object sets.

FIG. 10 further illustrates an example of relationships between one or more selected data sources and linked object sets. FIGS. 1-6 illustrate the first sidebar 110 as displaying data sources 108 and linked object sets 114 that may be used to perform analysis of a selected data source, for example, datasource1 111, datasource2 113, etc. As illustrated in FIG. 10, a plurality of data sources 1105 may be available to be selected by a user. Each of the data sources 1105 may have a number of linked object sets 1110 associated with each of the data sources 1110. Accordingly, for a selected data source 1 shown in panel 1110, there may be a plurality of linked object sets 1110. Each of the linked object sets 1110 has a link between one or more fields of the object set in one or more fields of data source 1, each of the links based on an ontology, for example, as described in reference to FIG. 9. In some embodiments, a data source in a linked object set will be linked only by one common field (e.g., an identifier of a person). In other embodiments, a data source in a linked object set will be linked by more than one common field. In the embodiments illustrated in FIGS. 1-6, once a user selects a particular data source (e.g., datasource1 111) from the list of data sources 108 in the first sidebar 110, a list of linked object sets 114 displayed are in the first sidebar 110. If the user selects a different data source (e.g., datasource2 113, FIG. 1) in the first sidebar 110, the linked object sets 114 correspondingly displayed in the first sidebar 110 may be a different list of linked object sets which correspond to the selected different data source (e.g., datasource2 113).

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   one or more computer storage mediums configured to store data sets relationally-linked based on an ontology and store computer-executable instructions;
   one or more computer hardware processors configured to execute the computer-executable instructions to:
   generate and cause display in a user interface a thumbnail chart of a first chart, a thumbnail chart of a second chart, and a thumbnail chart of a third chart, each of the displayed thumbnail charts of the first chart, second chart, and third chart including information of a linked object set, and each of the displayed thumbnail charts of the first chart, second chart, and third chart corresponding to different filtering of the linked object set, and wherein the thumbnail chart of the second chart indicates filtering operations on the linked object set that occurred subsequent to the filtering operations indicated by the thumbnail chart of the first chart;
   receive a first user selection of one of the displayed first, second and third thumbnail charts;
   display a fourth chart in a main panel of the user interface corresponding to the selected thumbnail chart;
   reset the filtering displayed in the user interface to reflect the fourth chart displayed in the user interface; and
   receive a second user input indicating to perform additional filtering of information in the fourth chart using the fourth chart as the starting point for the additional filtering.

2. The system of claim 1, wherein the one or more computer hardware processors are further configured to generate and display the thumbnail chart of the first chart in a first sidebar of the user interface, the first sidebar being displayed adjacent to the main panel of the user interface.

3. The system of claim 2, wherein the one or more computer hardware processors are further configured to generate and display the thumbnail chart of the first chart and the thumbnail chart of the second chart in the first sidebar of the user interface.

4. The system of claim 2, wherein the one or more computer hardware processors are further configured to generate and display the thumbnail chart of the first chart, the thumbnail chart of the second chart, and the thumbnail chart of the third chart in the first sidebar of the user interface.

5. The system of claim 4, wherein the thumbnail chart of the third chart indicates filtering operations on the linked object set that occurred subsequent to the filtering operations indicated by the thumbnail chart of the second chart.

6. The system of claim 5, wherein the first sidebar is located in a position lower on the user interface than the main panel, relative to the orientation of the user interface.

7. The system of claim 1, wherein the one or more computer hardware processors are further configured to generate and cause graphical display of an indicator of a first filter in a second sidebar displayed in a lateral position on the user interface relative to the main panel, and to generate and cause graphical display of the selected thumbnail chart and the first filter in a third sidebar located displayed in a position between the second sidebar and the main panel.

8. The system of claim 7, wherein the one or more computer hardware processors are further configured to generate and display the thumbnail charts in a first sidebar of the user interface.

9. The system of claim 8, wherein the first sidebar is displayed in a position lower on the user interface than the main panel, relative to the orientation of the user interface.

10. The system of claim 1, wherein the one or more computer hardware processors are further configured to execute the computer-executable instructions to generate and cause display of a user selectable fields of a first data source in a sidebar, wherein the thumbnail chart of the first chart depicts information of at least one of the user selectable fields.

11. The system of claim 10, wherein the one or more computer hardware processors are further configured to execute the computer-executable instructions to allow a user to continue filtering operations and analysis from the same point as is reflected by the selected thumbnail chart.

12. The system of claim 1, wherein the one or more computer hardware processors are further configured to execute the computer-executable instructions to:
   receive a user input of a selection of a displayed thumbnail chart;
   display a chart corresponding to the selected thumbnail chart in the main panel; and
   reset the filtering of the linked object set to reflect the chart displayed in the main panel.

13. A method for graphically filtering data sets linked by an ontology, the method comprising:
   generating and causing display in a user interface of a first thumbnail chart, a second thumbnail chart, and a third thumbnail chart, each of the displayed thumbnail charts indicating information associated with a data set, and each of the displayed thumbnail charts corresponding to different filtering of the data set, wherein the second thumbnail chart indicates filtering operations on the data set that occurred subsequent to the filtering operations indicated by the first thumbnail chart;
   receiving a first user selection of one of the displayed first, second and third thumbnail charts;
   displaying a fourth chart in a main panel of the user interface corresponding to the selected thumbnail chart;
   resetting the filtering displayed in the user interface to reflect the fourth chart displayed in the user interface; and
   receiving a second user input indicating additional filtering of information in the fourth chart using the fourth chart as the starting point for the additional filtering.

14. The method of claim 13, further comprising generating and displaying the thumbnail chart of the first chart and the thumbnail chart of the second chart in a first sidebar of the user interface.

15. The method of claim 13, further comprising generating and displaying the thumbnail chart of the first chart, the thumbnail chart of the second chart, and the thumbnail chart of the third chart in a first sidebar of the user interface.

16. The method of claim 15, wherein the thumbnail chart of the third chart indicates filtering operations on the linked object set that occurred subsequent to the filtering operations indicated by the thumbnail chart of the second chart.

17. The method of claim 15, wherein the first sidebar is located in a position lower on the user interface than the main panel, relative to the orientation of the user interface, and wherein the method further comprises generating and graphically displaying an indicator of a first filter in a second sidebar displayed in a lateral position on the user interface relative to the main panel, and generating and graphically displaying the selected linked object set and the first filter in a third sidebar displayed in a position between the second sidebar and the main panel.

* * * * *

UNITED STATES PATENT AND TRADEMARK OFFICE
CERTIFICATE OF CORRECTION

| | | |
|---|---|---|
| PATENT NO. | : 12,026,810 B2 | Page 1 of 1 |
| APPLICATION NO. | : 17/449868 | |
| DATED | : July 2, 2024 | |
| INVENTOR(S) | : Daniel Cervelli | |

It is certified that error appears in the above-identified patent and that said Letters Patent is hereby corrected as shown below:

On the Title Page

Page 2, Column 1 (Other Publications), Line 1, delete "Appl. No. 10/861,203, Ontology-Based" and insert -- Pat. No. 10,861,203, Ontology-Backed --.

Page 2, Column 1 (Other Publications), Line 3, delete "Appl. No. 11/164,350, Ontology-Based" and insert -- Pat. No. 11,164,350, Ontology-Backed --.

Signed and Sealed this
Fourth Day of February, 2025

Coke Morgan Stewart
*Acting Director of the United States Patent and Trademark Office*